(12) United States Patent
Leung et al.

(10) Patent No.: US 8,155,097 B2
(45) Date of Patent: *Apr. 10, 2012

(54) SYSTEM AND METHOD FOR ESTIMATING INTERFERENCE IN A PACKET-BASED WIRELESS NETWORK

(75) Inventors: Kin K. Leung, Edison, NJ (US); Jack Harriman Winters, Middletown, NJ (US)

(73) Assignee: AT+T Corp., New York, NY (US)

( * ) Notice: Subject to any disclaimer, the term of this patent is extended or adjusted under 35 U.S.C. 154(b) by 690 days.

This patent is subject to a terminal disclaimer.

(21) Appl. No.: 12/283,520

(22) Filed: Sep. 12, 2008

(65) Prior Publication Data

US 2009/0010242 A1 Jan. 8, 2009

Related U.S. Application Data

(63) Continuation of application No. 10/211,788, filed on Aug. 2, 2002, now Pat. No. 7,453,861.

(51) Int. Cl.
*H04B 7/216* (2006.01)
*H04B 1/00* (2006.01)
*H04B 7/00* (2006.01)

(52) U.S. Cl. .............. 370/342; 455/63.1; 455/67.11
(58) Field of Classification Search ............... 370/328, 370/337, 347, 252; 455/63.1–67.13
See application file for complete search history.

(56) References Cited

U.S. PATENT DOCUMENTS

| 5,491,837 | A  | * | 2/1996  | Haartsen    | 455/62  |
| 6,256,486 | B1 | * | 7/2001  | Barany et al. | 455/296 |
| 6,799,044 | B1 | * | 9/2004  | Wesby et al. | 455/452.1 |
| 7,116,983 | B2 | * | 10/2006 | Lan et al.  | 455/452.2 |
| 7,453,861 | B2 | * | 11/2008 | Leung et al. | 370/342 |

* cited by examiner

*Primary Examiner* — Thai Hoang (57) ABSTRACT

A system and method for predicting future interference power in packet-switched networks is disclosed, allowing improved performance in such networks via optimized link adaptation and power control. In an embodiment for use in a cellular network, Kalman filtering can be used to provide the interference estimation through identification of the number of active co-channel interferers in the cellular networks and correlation of the interference power with the number of active interferers. A two-dimensional Kalman filter can be used to exploit that correlation to enhance prediction accuracy. In an alternative embodiment, a one-dimensional Kalman filter can be used where the number of active interferers is not considered.

12 Claims, 6 Drawing Sheets

COMPARISON OF 90TH PERCENTILE ESTIMATION ERRORS

*FIG. 5*

SYSTEM AND METHOD FOR ESTIMATING INTERFERENCE IN A PACKET-BASED WIRELESS NETWORK

CROSS-REFERENCE TO RELATED APPLICATIONS

This non-provisional application is a continuation and claims the benefit of U.S. application Ser. No. 10/211,788, filed Aug. 2, 2002 now U.S. Pat. No. 7,453,861.

The present application is related to the following application assigned to the assignee of the present application, which is incorporated herein by reference: U.S. patent application Ser. No. 09/460,993, filed Dec. 15, 1999, now U.S. Pat. No. 6,519,705, entitled "A Method and System for Power Control in Wireless Networks Using Interference Prediction with an Error Margin."

BACKGROUND

1. Field of the Invention

The present invention relates generally to improving performance in a packet-based network, and more specifically to accurately estimating future interference power in packet-switched wireless networks.

2. Background

A packet-based network, such as the Internet, can be used to transmit data for various applications and devices, including, for example, cellular phones. A packet-switched cellular network is one example of a packet-based network for transmitting data. In such a packet-switched cellular network, a base station can transmit packets of data that can be reassembled into voice and other information over calls utilizing cellular phones. In such an exemplary cellular network, a transmitter or receiver can be either a base station or a terminal, where the base station is the fixed location that transmits a signal to a cellular (i.e., mobile) phone and a terminal is the mobile unit (e.g., the cellular phone). The future generations of wireless networks must accommodate a growing demand for data packet services. High-speed packet services are necessary for wireless data packet communications, such as Internet protocol (IP), which can provide efficient access to remote networks and servers for telecommuters and facilitate wireless multimedia services such as voice, audio, still-image and video.

It is well known that link adaptation (i.e., the choosing of an appropriate modulation level and associated data rate for transmission of the data packets) and power control (i.e., the dynamic setting of transmission power in order to ensure correct reception while minimizing interference to others) can improve performance of such packet-switched cellular networks. The expected performance gain of these techniques requires accurate prediction of future interference power.

More specifically, link adaptation involves choosing an appropriate modulation level (and associated data rate) for a packet transmission, according to the current link condition. When the radio condition is favorable, a complex modulation can be used for transmission to improve network throughput. On the other hand, when the co-channel interference and/or the signal-path gain between the transmitter and receiver are poor, the packet transmission can be adapted using a robust modulation as a way to ensure correct signal reception. The radio link condition can be determined from the estimated signal-to-interference-plus-noise ratio (SINR), which in turn depends on the interference from neighboring cells, the signal-path gain and the transmission power. Results have shown that significant performance gain can be achieved by appropriate link adaptation algorithms.

Known techniques for dynamic transmission power control have been widely studied and practiced to manage interference in cellular radio networks. To meet the need of bursty traffic characteristics in the wireless packet networks, power control techniques have been proposed to track the (co-channel) interference power and signal-path gain separately. According to the two estimated values, transmission power is then adjusted to yield a given SINR. Results have shown that power control can significantly improve performance of the future wireless packet networks. Thus, in order to obtain the expected performance gain by link adaptation and power control, it is important to estimate future interference power accurately.

In traditional cellular networks that are predominantly circuit-switched and used for voice applications, a transmitter usually remains on for a relatively long period of time. Consequently, interference has a very strong temporal correlation, which enables use of a low-pass filter to remove random measurement errors. For this reason, exponential smoothing techniques are commonly used for that type of environment. Such simple filtering, however, is not adequate for wireless packet-switched networks because such networks are based on packet switching in which each transmitter uses an assigned channel to transmit for a relatively short time before the channel is re-assigned to another transmitter. As a result, the temporal correlation of interference is weaker in the packet-switching environment than in the circuit-switched networks.

As an example, the Enhanced Data rates for GSM Evolution (EDGE) system, one of the standardized third generation networks, supports integrated voice and data services utilizing packetized data. Using multiple modulation and coding levels, the EDGE system employs a link-adaptation technique to adapt packet transmission to one of the modulation levels.

In the same EDGE system (and other wireless packet-switched networks), estimating future interference power with measurement errors involves at least two challenging issues. First, interference power is equal to the difference between the total received power and the power of the desired signal. Measuring total received power is relatively easy. While the power of the desired signal can be measured by filtering based on the training symbols for the signal, such measurements can be quite difficult, particularly when the measurement duration is short. The second aspect of the difficulty is that interference measurements typically contain errors (e.g., due to thermal noise).

Figure 1:
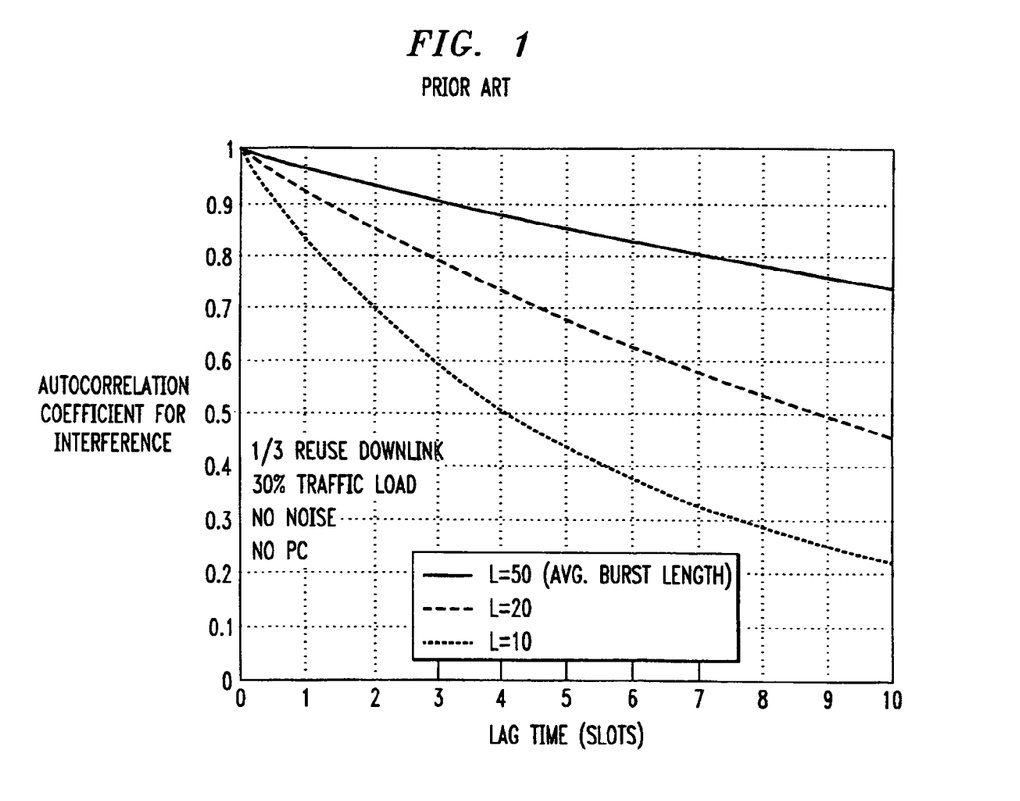
FIG. 1 is a graphic representation showing the autocorrelation between interference and burst length in systems according to the prior art.

To illustrate the impact of data packet transmissions that occur in bursts (i.e., transmissions of very short duration), let us consider downlink transmissions in a time division multiple access (TDMA) cellular network with ⅓ frequency reuse. FIG. 1 shows the representative autocorrelation coefficient for the interference power with fixed transmission power, no thermal noise and typical radio parameters. As shown in the figure, depending on the average burst length L, the autocorrelation decreases quickly as a function of the lag time in slots. Although the burst length depends on the data rates and the traffic characteristics of applications, L reaching as low as 10 is common, especially in high-speed networks. Such reduced autocorrelation reveals rapid changes in interference power. As a result, both the interference power and the measurement error now fluctuate from one time slot to the next. Consequently, simple filtering solutions (such as low-pass filters) not only filter out measurement errors, but also smooth out quick changes in interference power, resulting in erroneous estimation of future interference levels.

Co-pending application entitled "A Method and System for Power Control in Wireless Networks Using Interference Prediction with an Error Margin", U.S. patent application Ser. No. 09/460,993, commonly owned by the assignee hereunder, discloses a method for improving power control using a prediction of future interference power via, in one embodiment, a one-dimensional Kalman filter. The method disclosed, however, does not take advantage of the additional improvement provided by correlating the number of active interferers.

There is, therefore, a need in the art for a method to predict interference power in the presence of measurement errors in packet-switched networks by tracking interference and noise power separately and correlating the number of active interferers.

SUMMARY

In accordance with this invention, the interference power at a receiver in a wireless network communications system can be estimated by determining a number of active interferers for a time slot and measuring interference power for that time slot. Based on the number of active interferers and the interference power for the given time slot, the interference power for a subsequent time slot and a number of active interferers for a subsequent time slot can be determined by correlating the measured interference power and the number of active interferers for the preceding time slot. Furthermore, the interference power estimation can be achieved by transmitting training sequences of data with each user signal, measuring the received signal power at a receiver from the training sequences that were transmitted, and estimating the number of active interferers based on the received signal power. The interference power and the number of active interferers can be determined using a two-dimensional Kalman filter.

DETAILED DESCRIPTION

Figure 2:
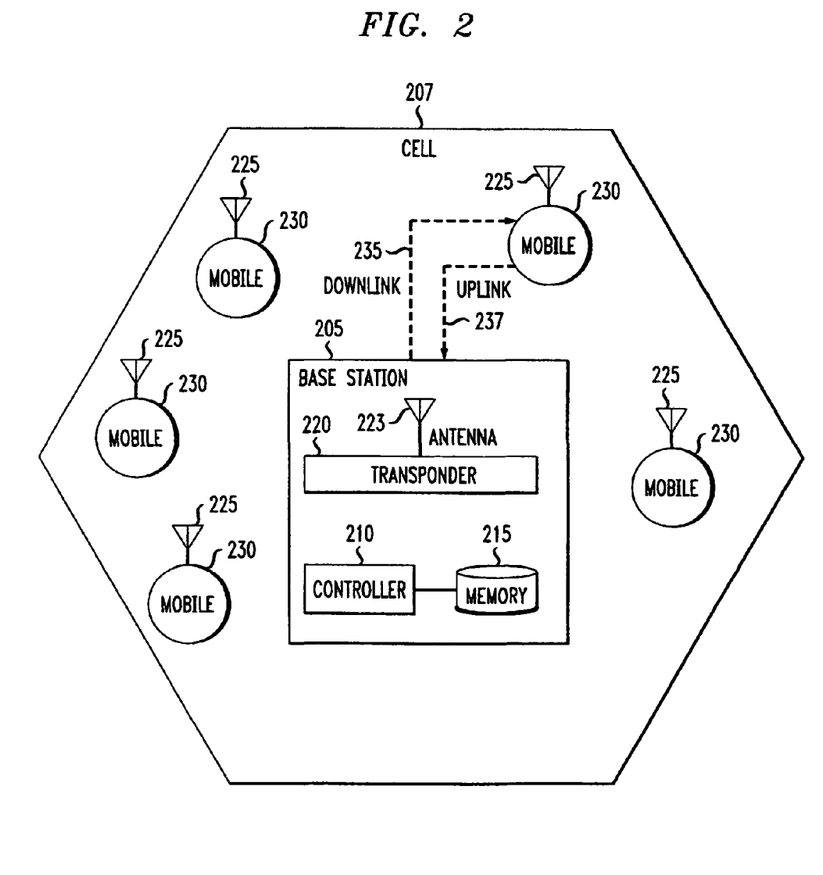
FIG. 2 is a is a block diagram of a network in which the present invention could be used to estimate power.

FIG. 2 depicts an exemplary network in which the present invention could be used to estimate interference. The word "exemplary" is used exclusively herein to mean "serving as an example, instance, or illustration." Any embodiment described herein as "exemplary" is not necessarily to be construed as preferred or advantageous over other embodiments. FIG. 2 is an exemplary block diagram depicting one cell 207 of a wireless cellular communication network. A base station 205 operates within the cell 207. The base station 205 contains a controller 210, a memory 215, a transponder 220, and an antenna 223. Numerous mobile terminals 230 located within the cell 207 communicate with the base station 205 via the antenna 225, uplink channel 237 and a downlink channel 235.

For the purposes of this application, a number of environmental and system conditions can be assumed. In particular, the uplink channel 237 and the downlink channel 235 are each subject to attenuation due to path gain (effectively attenuation) between the base station 205 and the mobile terminals 230. Effectively, the path gain is the sum of the path loss and the shadow fading for the radio link.

Furthermore, a medium-access control (MAC) protocol can be used within the cell 207, which allows at most one mobile terminal 230 in each cell 207 to transmit at a time. That is, no data contention occurs within the same cell 207. Therefore, only one mobile terminal 230 communicates with the base station 205 in a given time slot. Due to the large volume of data involved, the base station 205 typically cannot exchange control and scheduling information with another base station operating in a different cell. Finally, the interference power for a particular time slot can be measured at the base station 205 and mobile terminals 230 but may include noise and errors.

According to one embodiment of the present invention, the interference power can be measured at an intended receiver and then used as an input to a prediction algorithm to calculate a predicted interference. The predicted interference, along with an error margin calculated using an error estimating algorithm, can be used, for example, to set the power level for a transmitter. In particular, according to one embodiment of the present invention, to perform power control for the uplink channel 237 (i.e., from the mobile terminal 230 to the base station 205), the intended receiver, the base station 205, measures the interference power for a time slot. The controller 210 is adapted to estimate the interference level for a future time slot along with the estimated error margin of that interference and then calculate a power transmission level for the future time slot in order to meet a target signal-interference-noise-ratio (SINR). Upon determination of the power level for the future time slot, the base station 205 can instruct the mobile terminal 230 to transmit at the calculated power level, using the downlink channel 235.

According to one embodiment of the present invention, in order to perform downlink power control (i.e., from the base station 205 to the mobile terminal 230), the intended receiver (i.e., mobile terminal 230) measures the interference power for a time slot. Mobile terminal 230 transmits the measured interference power to base station 205, which then runs a prediction algorithm along with the estimated error margin algorithm to calculate the power level for its own transmission at a future time slot. However, in an alternative embodiment, mobile terminal 230 runs the prediction algorithm and estimated error margin algorithm itself and then transmits the calculated power level to the base station 205 via uplink channel 237.

Further, a Time Division Multiple Access (TDMA) cellular network (such as that shown in FIG. 2) can divide a radio channel (i.e., a carrier frequency) into multiple slots, wherein each slot represents the right to use a particular frequency over a defined period of time. According to the well known medium-access control (MAC) protocols that can be utilized in such a network, a maximum of one transmitter (either a base station or a terminal) in each cell may send data on to a given channel at a time. That is, no data contention occurs on the radio channel within the same cell. Multiple, contiguous time slots can be used by the same transmitter for sending a data message. The length of a data message is random and characterized by a probability distribution.

In the network shown in FIG. 2, a small number of training sequences can be assigned for transmission in various cells. These training sequences can consist of predefined data sequences known by each base station and terminal, which would be transmitted separately from the actual signal data between the base station and terminal. The training sequences can be generated in such a way that each receiver (i.e., a base station or a terminal) in the network has knowledge of all of the training sequences in the network. In addition, each receiver can also know the sequences used for data transmission in its home cell. Based on such knowledge, any errors encountered by a receiver in quickly measuring interference power in each time slot can be minimized. Since the interference power is equal to the difference between the total received power and the power of the signal sent within the home cell, the latter can be measured by filtering based on the training sequences for the signal. The result will be used to estimate the interference power within each time slot.

Also, based on the knowledge of the training sequences, each receiver can accurately estimate the number of active co-channel interferers that are transmitting in a given time slot. The positive correlation that has been observed between the interference power and the number of active co-channel interferers allows, in one embodiment, the use of a two-dimensional Kalman-filter approach to provide a more accurate prediction of interference than current techniques.

Figure 3:
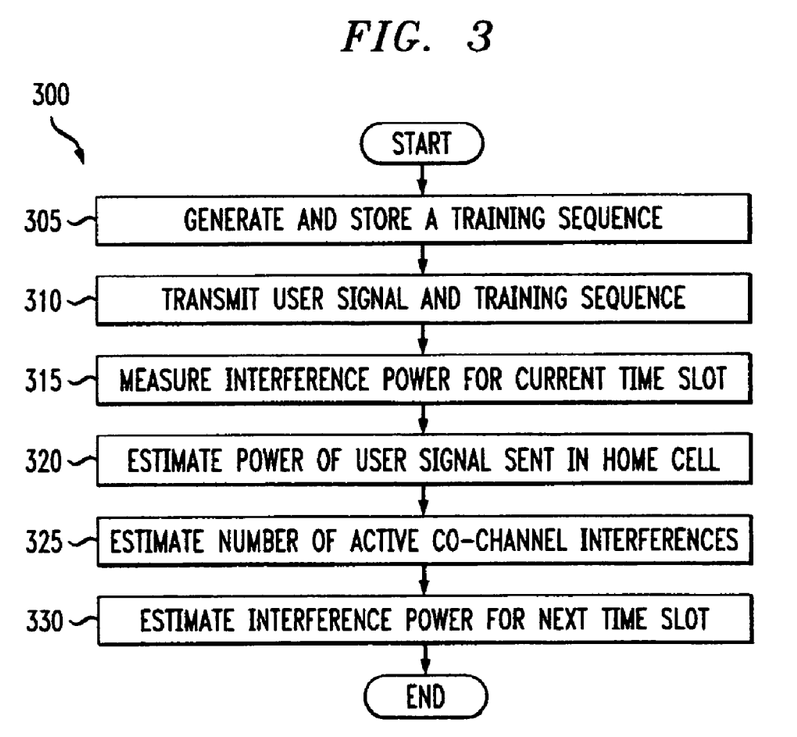
FIG. 3 is a flow chart of a method for estimating interference power in a packet-based network according to the present invention.

FIG. 3 contains a flow chart 300 depicting the process of determining interference power, according to an embodiment of the present invention. In step 305, a base station or receiver can generate and store a training sequence. Once the training sequence has been stored, it can be transmitted along with the actual user signal being transmitted in step 310. Next, the interference power for the current time slot can be measured in step 315.

Once the interference power for the current time slot has been measured in step 315, the power of a signal sent within the home cell can be estimated in step 320 by filtering based on training sequences for the signal (i.e., the training sequence that was added to the transmitted signal in step 315). Since the training sequences are known to the receiver, the number of active co-channel interferers can also be estimated by using a two-dimensional filter in the filtering process in step 325. Finally, the interference power for the next time slot can be estimated in step 330 by subtracting the estimated power of the signal sent within the home cell from the total measured power for the current time slot.

Specifically, for a given receiver, let $x_k = (i_k, n_k)^T$ denote the process state where $i_k$ and $n_k$ are the actual interference power in mW and the number of active co-channel interferers for time slot k, respectively. The process can be modeled as shown in Equation (1):

$$x_{k+1} = \begin{bmatrix} i_{k+1} \\ n_{k+1} \end{bmatrix} = \Phi x_k + w_k = \begin{pmatrix} 1 & 0 \\ 0 & 1 \end{pmatrix} \begin{bmatrix} i_k \\ n_k \end{bmatrix} + \begin{bmatrix} w_k^i \\ w_k^n \end{bmatrix} \quad (1)$$

where $\Phi$ is an identity matrix and $w_k = (w_k^i, w_k^n)^T$. Further, $w_k^i$ and $w_k^n$ can be white Gaussian sequences that represent the respective changes of interference power and number of active interferers from one time slot to the next. In essence, both $i_k$ and $n_k$ can be modeled as Brownian-motion processes, as detailed in *Introduction to Random Signals and Applied Kalman Filtering*, 3rd Edition, John Wiley & Sons, New York (1997). The observation state at slot k can be denoted as $z_k = (j_k, m_k)^T$ and the observation of the process can be represented as shown in Equation (2):

$$z_k = \begin{bmatrix} j_k \\ m_k \end{bmatrix} = \Phi x_k + v_k = \begin{pmatrix} 1 & 0 \\ 0 & 1 \end{pmatrix} \begin{bmatrix} i_k \\ n_k \end{bmatrix} + \begin{bmatrix} v_k^i \\ v_k^n \end{bmatrix} \quad (2)$$

where $v_k = (v_k^i, v_k^n)$ denote white Gaussian observation noise (error) for $i_k$ and $n_k$, respectively. According to Kalman filter theory, the time and measurement update equations for $x_k$ can be represented as shown in Equations (3) through (7):

$$\tilde{x}_{k+1} = \hat{x}_k \quad (3)$$

$$\tilde{P}_{k+1} = \hat{P}_k + Q_k \quad (4)$$

$$K_k = \tilde{P}_k [\tilde{P}_k + R_k]^{-1} \quad (5)$$

$$\hat{x}_k = \tilde{x}_k + K_k [z_k - x_k] \quad (6)$$

$$\hat{P}_k = [1 - K_k] \tilde{P}_k \quad (7)$$

where $\tilde{x}_k$ and $\hat{x}_k$ denote the a priori and a posteriori estimates of $x_k$ respectively, $\tilde{P}_k, \hat{P}_k$ denote the a priori and a posteriori estimate-error variances respectively, $K_k$ represents the Kalman gain, and $Q_k$ and $R_k$ represent the covariance matrices for the process noise $w_k$ and $v_k$, respectively. By definition, the covariance matrix $Q_k$ for $w_k$ can be represented as shown in Equation (8):

$$Q_k = E[w_k w_k^T] = \begin{bmatrix} p_k^2 & \text{cov}(w_k^i, w_k^n) \\ \text{cov}(w_k^i, w_k^n) & \sigma_k^2 \end{bmatrix} \quad (8)$$

where $p_k^2$ and $\sigma_k^2$ represent the respective variances for the changes of interference power and the number of active interferers in slot k, and $\text{cov}(w_k^i, w_k^n)$ is the covariance of $w_k^i$ and $w_k^n$ in slot k. Similarly, the covariance matrix for $v_k$ can be represented as shown in Equation (9):

$$R_k = E[v_k v_k^T] = \begin{bmatrix} \varphi_k^2 & \text{cov}(v_k^i, v_k^n) \\ \text{cov}(v_k^i, v_k^n) & \pi_k^2 \end{bmatrix} \quad (9)$$

where $\Phi_k^2$ and $\pi_k^2$ represent the variance for the interference measurement error and that for the error in estimating the number of active interferers in slot k, respectively, and cov $(v_k^i, v_k^n)$ represents the covariance of $v_k^i$ and $v_k^n$ in slot k. As the number of active interferers in each time slot can be determined fairly accurately, $R_k$ becomes $$R_k = \begin{bmatrix} \Phi_k^2 & 0 \\ 0 & 0 \end{bmatrix} \quad (10)$$

Elements of $Q_k$ in (8) can be estimated by a windowing scheme as follows: first, using measurements in a sliding window of W slots, the average changes of interference power and the number of active interferers from one time slot to the next can be obtained using Equations (11) and (12):

$$\bar{j}_k^\varpi = \frac{1}{W} \sum_{l=k-W+1}^{k} j_l - j_{l-1} \quad (11)$$

$$\bar{m}_k^\varpi = \frac{1}{W} \sum_{l=k-W+1}^{k} m_l - m_{l-1} \quad (12)$$

respectively. Then, the elements of $Q_k$ can be approximated using Equations (13), (14), and (15):

$$p_k^2 \approx \frac{1}{W-1} \sum_{l=k-W=1}^{k} [(j_{l-k_{l-1}}) - \bar{j}_k^\varpi]^2 \quad (13)$$

$$\sigma_k^2 \approx \frac{1}{W-1} \sum_{l=k-W=1}^{k} [(m_{l-m_{l-1}}) - \bar{m}_k^\varpi]^2 \quad (14)$$

and $$\text{cov}(w_k^j, w_k^n) \approx \frac{1}{W-1} \sum_{l=k-W+1}^{k} (j_l - j_{l-1} - \bar{j}_k^\varpi)\left(m_l - m_{l-1} - \bar{m}_k^\varpi\right) \quad (15)$$

Note that $j_1$'s in Equation (11) include the interference measurement errors $\{v_k^i\}$ which have a Gaussian distribution with zero mean. Despite this, if W is chosen large enough (e.g., approximately 1000), (11) gives an unbiased estimate of average changes of interference power in consecutive time slots. Thus, (13) and (15) provide good approximations of $p_k^2$ and $\text{cov}(w_k^i, w_k^n)$. As the number of active interferers can be determined accurately, $v_k^n$ is zero for all k in (2). As a result, (14) is an appropriate estimate for the variance of $w_k^n, \sigma_k^2$.

The variance of the interference measurement error $\{\Phi_k^2\}$ in (10) depends on the noise level and the error characteristics of the measurement circuit in use. In practice, $\sigma_k^2$ can be determined by, for example, measuring the "received" power on a known, idle channel. Thus, the variance of the "received" power over a time window can serve as an estimate of $\Phi_k^2$.

Figure 4:
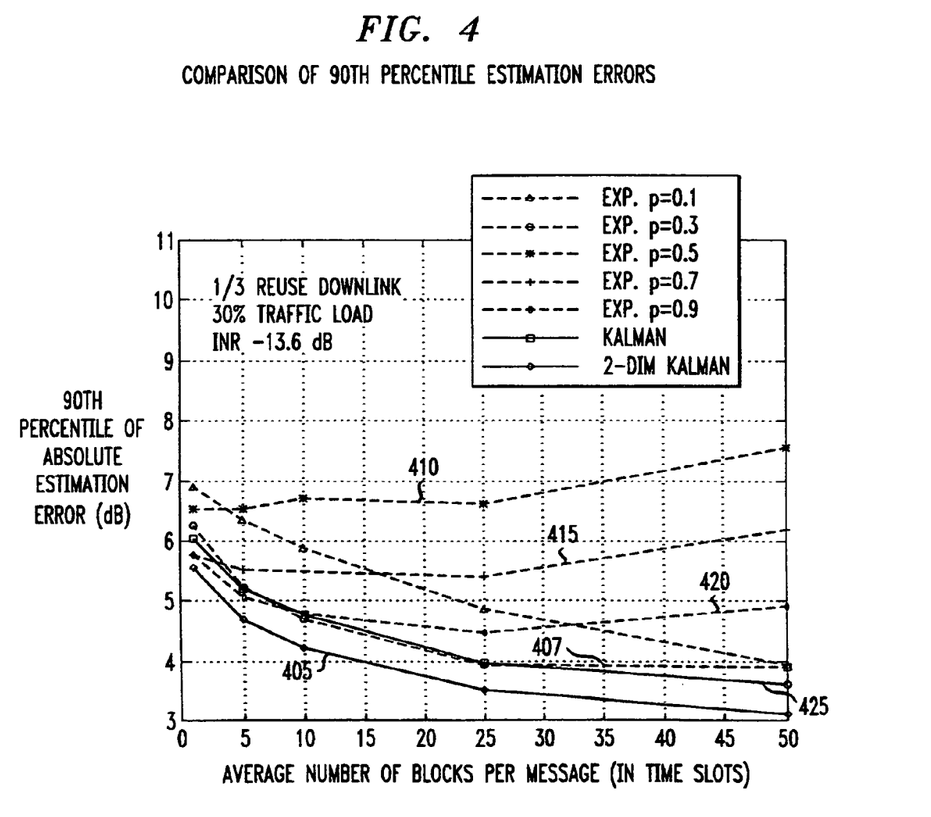
FIG. 4 is a graph comparing the performance of other methods of estimating interference power with an embodiment of the present invention.

FIG. 4 illustrates the performance of an embodiment of the present invention against other methods of estimating interference power. In particular, FIG. 4 compares the 90$^{th}$ percentile of the absolute estimation error (i.e., the absolute difference between the actual interference power and the predicted value) for the present invention, depicted by curve 405, with that for the traditional exponential filtering with various parameters as a function of average burst length. The interference-to-noise ratio (INR) is about 13.6 dB. Depending on the burst length and the exponential parameter p, exponential filtering can perform anywhere from reasonably well (as shown by curve 407, with exponential parameter p equal to 0.3) to poorly (as shown by curves 410, 415, and 420, with exponential parameter p equal to 0.9, 0.7, and 0.5) in predicting interference. The performance of the simplified Kalman-filter method without use of the number of active interferers (denoted as "Kalman" and depicted by curve 425) is also presented in FIG. 4. Since this simplified method tracks the interference and noise separately, its interference prediction represents closely the best estimation by exponential filtering. The method of the present invention, whose performance is depicted by curve 405, yields the lowest prediction errors for a wide range of parameters and provides a 0.5 dB gain for the 90th percentile error over the simplified method, because the two-dimensional method exploits the positive correlation between interference and the number of active interferers. Since the burst length is unknown in advance, the proposed technique is efficient in estimating interference power for link adaptation and power control in future wireless packet networks.

Figure 5:
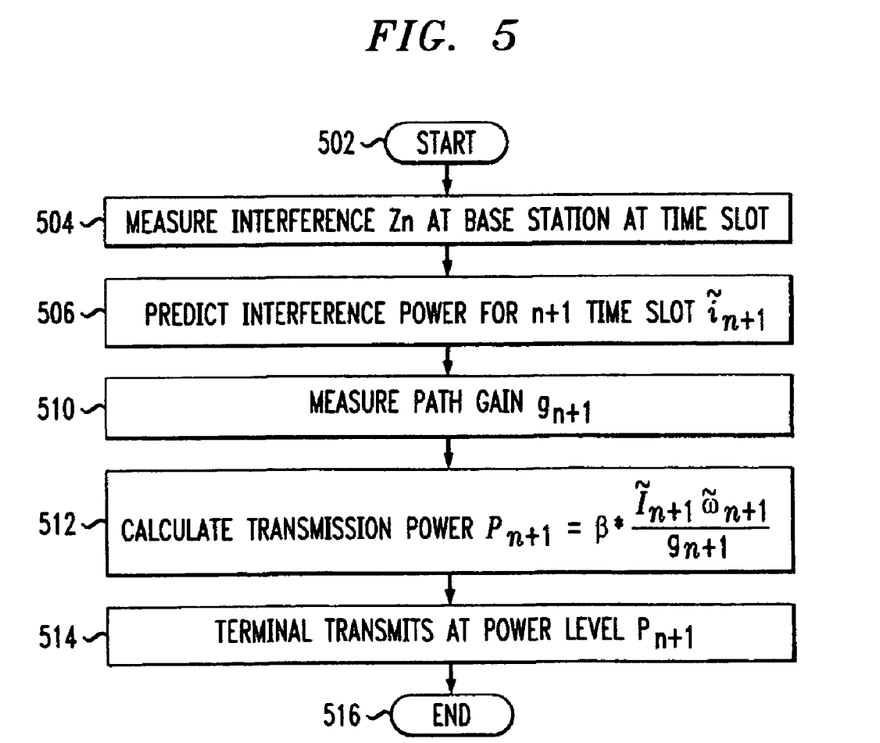
FIG. 5 is a flow chart of a method for performing power control using an estimation of interference power in a packet-based network according to an embodiment of the present invention.

FIG. 5 is an exemplary flowchart describing a method of transmission power control with an error margin for an uplink channel. According to one embodiment of the invention, a measurement of the interference power of an intended receiver is taken at a time slot n to set the power for a consecutive time slot n+1. In alternative embodiments, any number of time slots may exist between the time slot n in which a measurement is taken and a future time slot n+x in which the transmission power level is adjusted, where x is the interval size in time slots. Furthermore, the power control algorithm is run for every time slot n. However, this is not intended to limit the scope of the present invention, and in alternative embodiments the power control and error margin algorithms can be performed less frequently. For example, in alternative embodiments a fixed power level transmission can be used over the length of an entire message. This alternative approach is suitable for using polling schemes, such as the MAC protocol, where the transmission power can be included in the polling message and the polled terminal supply transmits that power level if it has data to send.

In step 502, the process begins at the beginning of time slot n, where the algorithm is initiated for the mobile terminal 230 scheduled to transmit in time slot n+1. In step 504, the current interference power $Z_n$ at the base station 205 (the intended receiver) is measured. Typically, the base station 205 would be equipped with an electronic device for measuring the current interference power. Methods for the measurement of interference power in wireless networks are well known. In general, the interference power is equal to the difference between the total power received and the power of the desired signal, where the power of the desired signal can be measured by filtering based upon a set of training symbols for the signal.

In step 506, the interference power for the time slot $\tilde{i}_{n+1}$ (in linear units) at the intended receiver, the base station 205, is predicted, where the mobile terminal 230 is scheduled to transmit in time slot n+1. The prediction can be implemented at the CPU 110 at the base station 205, which is adapted to run a prediction algorithm. According to one embodiment, the prediction algorithm employed is a two-dimensional Kalman filter as described in detail with reference to FIG. 3 and FIG. 4.

In step 510, a path gain parameter $g_{n+1}$ between the mobile terminal 230 and the base station 205 is measured. The methods for determination of the path gain $g_{n+1}$ between a mobile terminal 230 and a base station 205 in a wireless network are well known. In an alternative embodiment, the path gain is not measured for every time slot, but rather is measured once at the beginning of a message transmission and is used for the duration of the message transmission (i.e., for all packets comprising a message).

In step 512, the transmission power for the mobile terminal 230 scheduled to transmit in time slot n+1 is calculated using the equation:

$$P_{n+1} = \beta * \frac{\tilde{I}_{n+1}\tilde{\omega}_{n+1}}{g_{n+1}} \quad (1)$$

where $\beta^*$ is a target SINR, $g_{n+1}$ is the estimated path gain parameter, and $\tilde{I}_{n+1}$ is the predicted interference power for the time slot n+1 and $\omega_{n+1}$ is the error margin based on the errors between previous interference power predictions and actual interference power measurement. The desired result of the relationship in equation (1) is to choose the minimum power necessary to achieve the target SINR, and therefore minimize any interference with others without degrading the local link quality. According to one embodiment of the present invention, different SINR targets (β*) can be applied in equation (1) for different mobile terminals 230, depending on the path gain ($g_{n+1}$) to the particular base station 205 and the application requirements. For example, for a poor radio link with large path attenuation and unfavorable shadowing, the link can adapt to the poor quality by reducing its data rate. Thus, a lower SINR target (β*) may be used to support decreased data rate for the mobile terminal 230.

In step 514, the base station 205 instructs the mobile station 230 to transmit at the power level $P_{n+1}$ for the time slot n+1 via the downlink channel 235.

The embodiment described above describes power control for the uplink 237 channel (i.e., from the mobile terminal 230 to the base station 205). However, the present invention may also be applied for power control to the downlink 235 (i.e., between the base station 205 and the mobile station 230) without departing from the spirit and the scope of the present invention.

Figure 6:
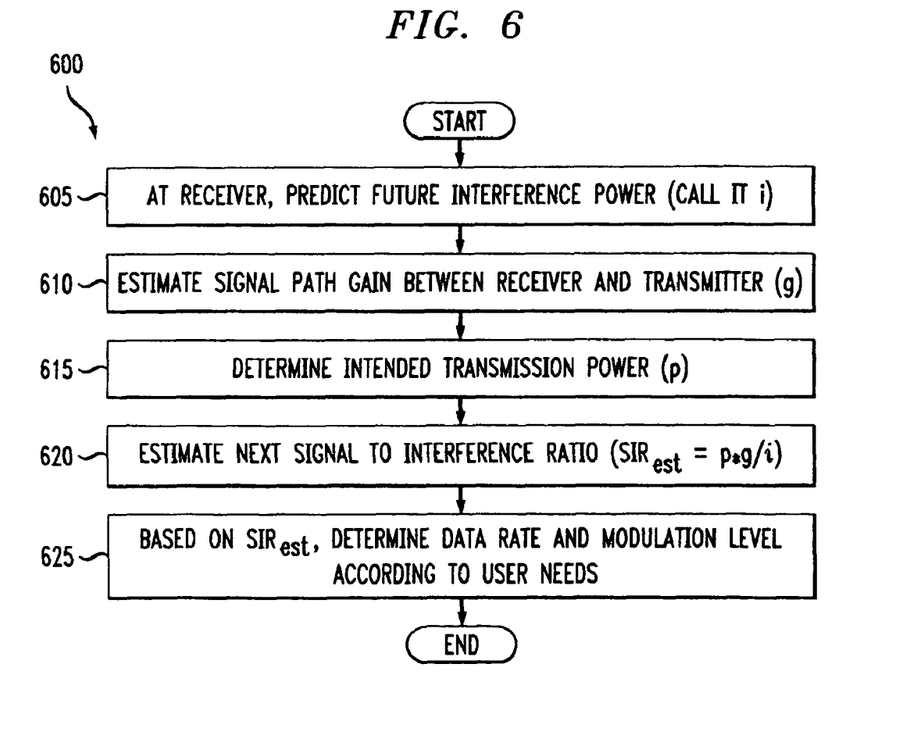
FIG. 6 is a flow chart of a method for performing link adaptation using an estimation of interference power in a packet-based network according to an embodiment of the present invention.

FIG. 6 depicts a flow chart 600 of a method for link adaptation that uses the above-described method of estimating interference power in a packet-based network. In step 605, the future interference power (denoted i) at a receiver is predicted according to the present invention. Once the interference power i is estimated, the signal path gain (denoted g) between the receiver and the transmitter is estimated in step 610. Next, in step 615, the intended transmission power (denoted p) is determined. Utilizing i, g, and p, the signal to interference ratio (denoted $SIR_{est}$) for the next time slot is estimated in step 620. Based on $SIR_{est}$, the data rate and modulation level are determined in step 625 according to the particular needs of the user.

While the invention has been described in detail, including references to specific embodiments, it will be apparent to one skilled in the art that changes and modifications can be made to the invention without departing from the spirit and scope thereof. Thus, it is intended that the present invention cover the modifications and variations of this invention provided they come within the scope of the appended claims and their equivalents.

Those of skill in the art would understand that information and signals in a packet-switched wireless network may be represented using any of a variety of different technologies and techniques. Those of skill would further appreciate that the functionality of the various illustrative logical blocks, modules, and algorithm steps described in connection with the embodiments disclosed herein may be implemented as electronic hardware, computer software, or combinations of both. Whether such functionality is implemented as hardware or software depends upon the particular application and design constraints imposed on the packet-switched wireless network. Skilled artisans may implement the described functionality in varying ways for each particular application, but such implementation decisions should not be interpreted as causing a departure from the scope of the present invention.

For example, the various illustrative equations and logical blocks described in connection with the estimation of the interference power disclosed herein, along with the methods or algorithms described in connection with the embodiments disclosed herein, may be implemented or performed with a general purpose processor, a digital signal processor (DSP), an application specific integrated circuit (ASIC), a field programmable gate array (FPGA) or other programmable logic device, discrete gate or transistor logic, discrete hardware components, software modules executing on a processor, or any combination thereof designed to perform the functions described herein.

Further, a software module may reside in RAM memory, flash memory, ROM memory, EPROM memory, EEPROM memory, registers, hard disk, a removable disk, a CD-ROM, or any other form of storage medium known in the art that can be implemented at a base station or terminal in a wireless telecommunications network. An exemplary storage medium can be coupled to the processor such that the processor can read information from, and write information to, the storage medium. In the alternative, the storage medium may be integral to the processor. The processor and the storage medium may reside in an ASIC. The ASIC may reside in a base station or terminal in a communications network. In the alternative, the processor and the storage medium may reside as discrete components in a base station or terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method executed in a first station during a communication session with a second station over a wireless network that employs time slots comprising:
   determining total signal power received in a first time slot of said communication session;
   estimating, for said first time slot, number of stations that interfere with reception of transmission by said second station;
   determining interference power in said first time slot from said stations that interfere by employing knowledge of training sequence transmitted by said second station:
   predicting interference power in a predetermined time slot subsequent to said first time slot, based on said number and said determined interference power, thereby forming a predicted interference power measure;
   determining a transmission power value for said subsequent time slot based on said predicted interference power measure; and
   communicating said transmission power value to said second station.

2. A method as in claim 1, where said predicting the interference power employs a two-dimensional Kalman filter that is sensitive to the number of active interferers and to said interference power in said first time slot from said stations that interfere.

3. A method as in claim 1, where said determining interference power is achieved by
   measuring power of signal transmitted in said first time slot by said second station; and
   subtracting said power of signal transmitted in said first time slot by said second station from said total received power.

4. A method as in claim 1, wherein said determining a transmission power value includes a step of estimating path gain between said first station and said second station at said subsequent time slot.

5. A method as in claim 1, wherein said determining a transmission power value is sensitive to a target signal to interference noise ratio.

6. The method of claim 1 where the steps of determining total signal power, estimating, determining interference power, predicting interference power, determining a transmission power value for said subsequent time slot, and communicating are executed for every time slot of said communication session.

7. The method of claim 1 where the steps of determining total signal power, estimating, determining interference power, predicting interference power, determining a transmission power value for said subsequent time slot, and communicating are executed less frequently than every time slot of said communication session.

8. The method of claim 7 where said steps are executed once during said communication session.

9. An interference power estimation apparatus in a first station in a wireless network for selecting a transmission power level to be used by a second station, comprising:
- a processing module for determining total signal power received in a first time slot;
- a processing module for estimating, for said first time slot, number of stations that interfere with reception of transmission by said second station;
- a processing module for determining interference power in said first time slot from said stations that interfere by employing knowledge of training sequence transmitted by said second station;
- a processing module for predicting interference power in a time slot subsequent to said first time slot, based on said number and said determined interference power, thereby forming a predicted interference power measure;
- a processing module for determining said transmission power level for said subsequent time slot based on said predicted interference power measure; and
- a module for communicating said transmission power level to said second station.

10. A computer-readable medium containing computer program instructions which, when executed by a processor, enable a receiver in a wireless network communications system to estimate interference power to enable a transmitter to transmit to the receiver at a transmission power that is a function of the estimated interference power, by:
- determining total signal power received in first time slot of said communication session:
- estimating, for said first time slot, number of stations that interfere with reception of transmission by said second station;
- determining interference power in said first time slot from said stations that interfere by employing knowledge of training sequence transmitted by said second station:
- predicting interference power in a time slot subsequent to said first time slot, in a manner based on said number and said determined interference power, thereby forming a predicted interference power measure;
- determining a transmission power value for said subsequent time slot based on said predicted interference power measure.

11. A computer-readable medium as in claim 10, wherein said computer program instructions, when executed by the processor to predict, employs a two-dimensional Kalman filter that is sensitive to the number of active interferers and to said interference power in said first time slot from said stations that interfere.

12. A computer-readable medium as in claim 10, wherein said computer program instructions, when executed by the processor, further enable said receiver to measure interference power for said first time slot by:
- measuring the total received power for said first time slot;
- measuring the power of a transmitted signal for said first time slot; and
- subtracting said power of said transmitted signal from said total received power.

* * * * *